United States Patent
Vicario

[15] 3,705,773
[45] Dec. 12, 1972

[54] METHOD AND APPARATUS FOR CONVEYING LIQUIDS TO BE ANALYZED TO AN AUTOMATIC SPECTROPHOTOMETRICAL READING CUVETTE

[72] Inventor: Guido Vicario, Piazza Guilio Cesare, Milan, Italy

[22] Filed: Feb. 5, 1971

[21] Appl. No.: 112,860

[52] U.S. Cl. ............................................... 356/180
[51] Int. Cl. ............................................... G01j 3/46
[58] Field of Search ..................... 356/180, 181, 173

[56] References Cited

UNITED STATES PATENTS 3,401,591  9/1968  Anthon ........................... 356/181

Primary Examiner—Ronald L. Wibert
Assistant Examiner—Conrad Clark
Attorney—Christen & Sabol

[57] ABSTRACT

Method and apparatus for carrying out spectrophotometrical and colormetrical tests, wherein by a syringe a first predetermined amount of liquid is drawn from a first container and introduced into a second analysis container, and then ejected by a vacuum pump to wash said second container, then by said syringe a second metered amount of liquid for test operations is introduced into said second container, then ejecting the analyzed liquid by said vacuum pump. The apparatus comprises means for continuous cyclic operation, for enabling at a desired time the measuring means for the measures to be carried out.

9 Claims, 1 Drawing Figure

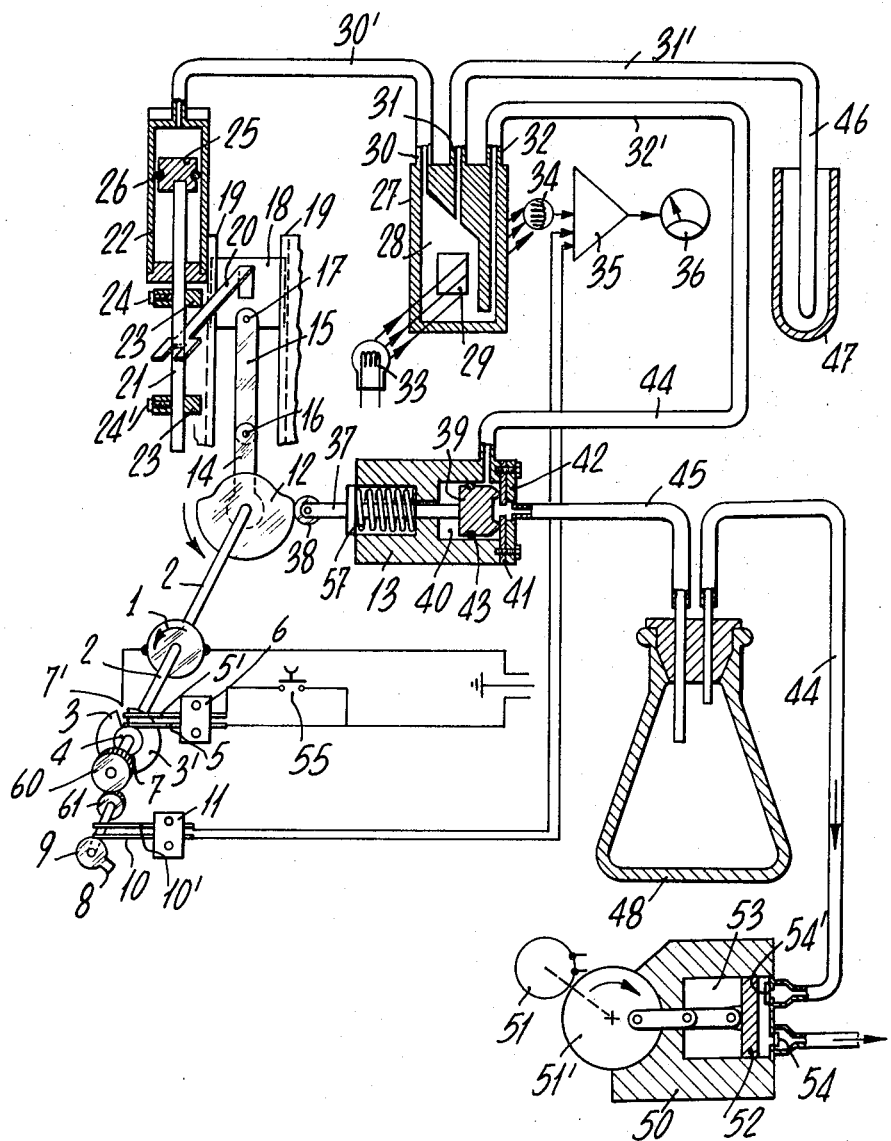

METHOD AND APPARATUS FOR CONVEYING LIQUIDS TO BE ANALYZED TO AN AUTOMATIC SPECTROPHOTOMETRICAL READING CUVETTE

This invention relates to a method and apparatus capable of automatically carrying a predeterminable amount of any liquid from a first container of any size, hereinafter referred to as test-tube, to another container generally comprising an automatic three-way cuvette, having such physical shape and characteristics as to be capable of carrying out spectrophotometrical and colormetrical tests on the liquid therein contained, and also successively automatically ejecting the sucked liquid from the cuvette, conveying it to a third exhaust container.

The apparatus is characterized by a flexible tube system of acid resistant material, the liquid to be analyzed passing therethrough, and interconnecting: a known three way, spectrophotometrical cuvette, a known glass calibrated syringe and associated piston, a valve controllably opened and closed for exhausting the hydraulic circuits, an electromechanical control for automatically controlling said syringe and valve, a known power driven vacuum pump sucking air from a hermetically sealed container referred to as flask, within which, upon evacuation, the liquid will exhaust on analysis completion through a conduit from said cuvette.

The various steps of the process as provided by the above described apparatus are as follows; transferring to the reading cuvette from the test-tube for a portion of the liquid therein contained as predetermined by the calibration of a syringe in order to wash the three-way cuvette interior from the residual liquid previously tested and to avoid contamination errors; ejecting the liquid contained in the cuvette by suction; repeatedly transferring to the cuvette from the test-tube for a second portion of liquid identical to the first portion and designed to be tested; signalling the spectrophotometrical reading systems about liquid transfer occurrence and then an interval for analysis accomplishment; finally ejecting the tested liquid from the cuvette still by suction.

The novel inventive concept consists of the principle for sucking and conveying from a test-tube to an automatic cuvette for spectrophotometrical chemical analyses metered liquid volumes through a syringe programmed by an electromechanical control; and also successively rapidly ejecting the liquid, on which the photometrical analyses have been carried out, through a flask and vacuum pump system.

Thus, the syringe sucks only the required amount of liquid, whereas the vacuum pump is not equally reliably controllable and in case of malfunction would exhibit the risk of sucking in a moment all the liquid from the test-tube and scatter it. Conversely, the exhaust is through the pump which, being provided with a highly violent action, will completely empty the cuvette. Should drainage be effected by the syringe, the action thereof would be by far less active.

For a better understanding of the invention, the apparatus according to the invention will be described in the following, reference being had to the accompanying DRAWING, in which said apparatus is schematically shown.

As shown in the drawing, the apparatus comprises an electric drive motor 1 supplied by a suitable electric power source, to which motor there is connected through a drive shaft 2 a first set of electrical contacts comprising two disc sections 3 and 3' of conductive material, separated from each other and suitably shaped and placed on an insulating bearing 4 fast with said shaft 2, and two laminar wiping contacts 5 and 5' embedded within an insulating bearing 6, the electric current flowing through these contacts when shorted by the disc sections 3 and 3' and being the flow shut off at the cable 7, 7' between said two disc sections 3 and 3', the wiping contact 5' being connected to a terminal of motor 1 and contact 5 directly connected to said electric power source. By shorting said laminar contacts 5 and 5', a pushbutton 55 enables to directly connect motor 1 to the power source to start the operation of the apparatus, as it will be explained in the following. Through the rotation of its shaft 2, said motor 1 also controls a second set of contacts, comprising: a conductive disc section 8 secured to the insulating bearing 9 and the wiping contacts 10 and 10' carried by the insulating bearing 11. Said contacts 10 and 10' are directly connected to the amplifier 35 of a measuring device for enabling said measuring to be carried out.

Fast with the drive shaft 2, on the central plane of the apparatus there are: a metal cam 12 operating by its profile and a suitable follower 37 a liquid valve 13 (shown in a sectional view); a handle 14 is also connected to said shaft 2, while at 16 one end of a piston rod 15 is pivoted to this handle 14, the other end of the piston rod being pivoted at 17 on a slide 18 free to run in two guides 19, the slide and guides being made of metal material. A fork 20 is secured on said slide 18 and encloses the metal stem 21 of a programmed syringe 22. Outside the syringe, the metal stem 21 carries two cylindrical block 23 and 23' freely slidable relative to said stem, but susceptible of being clamped at any desired position through a screw 24 and 24', respectively, and in addition the end of stem 21 inside of the syringe 22 is inserted and blocked in a piston 25 of acid resistant material, sliding within said syringe 22, the tight sealing between said piston and syringe being ensured by a gasket or ring 26 (shown in a sectional view), inserted in a proper peripheral groove in the piston 25.

Motor 1, guides 19; syringe 22 and valve 13 are all members which are secured on a metal rigid support, not shown in the drawing.

A known automatic cuvette 27 is outside the apparatus and is made of acid resistant material; therein a suitably sized chamber 28 is formed and provided on the front wall, and rear wall correspondingly, with two suitable apertures or windows 29 of transparent material for the passage therethrough of light beams from the light source 33. The hollow may be filled with liquid to be analyzed through conduits 30 and 31 and completely exhausted through conduit 32. Thus, as shown in the accompanying drawing, conduit 30 is connected to syringe 22 by the flexible hose 30', conduit 31 is connected by the flexible hose 31' to probe 46 which is inserted into the tube-test 47 containing the liquid to be analyzed and conduit 32 is connected by the flexible hose 32' to the inlet of valve 13, the outlet of which is connected in turn by the flexible hose or conduit 45 to the container or flask 48.

Through the two apertures or windows 29 in the cuvette 27, the spacing and size of which are known, the spectrophotometrical and colormetrical measuring is carried out by means of the light from said source 33, this light being in a per se known manner sensed by the photodetector 34 which applies a signal to the amplifier 35, the outlet of which is connected in turn to the measuring meter 36. As shown in the drawing, said valve 13 comprises a cylindrical shaft or follower 37, carrying at its extreme end a roller 38, which is retained by a pin and rotates following the profile of cam 12. The shaft 37 is also secured to a piston 39 of acid resistant material sliding within a cylindrical chamber 40 in the body of valve 13.

As shown in a sectional view in the drawing, said cylindrical piston 39 on being urged by the follower 37 will press against the gasket or seal 41 positioned between the cover 42 and the body of valve 13, thus preventing the liquid from passing from conduit 32' to conduit 45; liquid sealing against shaft 37 is ensured by a ring seal or gasket 43 of acid resistant material seated within a groove on piston 39, while a spring 57 is effective for maintaining the roller 38 of follower 37 always adhering to the profile of cam 12.

The withdrawal probe 46 is outside the apparatus and comprises a thin tube of acid resistant material connected to the reading cuvette 27. The test-tube 47 is an acid resistant container of any type; similarly, the flask 48 is a known device comprising a hermetically sealed container and is connected through the flexible hose 44 to the inlet of the vacuum pump 50, the latter being also a known device. Pump 50 is driven by a motor which through a piston rod cam device 51 is connected to a piston 52 which on reciprocating within the chamber 53 and through the opening or closing of valves 54 and 54' causes the air in the flask 48 to be sucked and delivered to the outside; when valve 13 is closed, vacuum will be provided in the flask 48.

The transfer of predetermined liquid volumes to the cuvette and associated reading are as follows:

The probe 46 is manually immersed into the test-tube 47, then the push-button 55 is depressed for a moment and because of being supplied the motor 1 starts to rotate driving the members connected thereto; during this rotation the sector 3', on shorting the contacts 5 and 5', will ensure a supply for motor 1 until the latter has rotated the shaft 2 by 180°. After rotation by 180°, the wiping contacts will be at hollow 7, thus breaking the circuit.

During the motor rotation, said shaft 2 will drive the cam 12, but without any change in the position of valve 13 which remains closed, the cam profile being unaltered through 180°. The shaft 2 also drives the handle 14 causing with lever 15 the slide 18 to move downwards, this slide through the fork 20 interposed between the stops 23 and 23' downward moving the stem 21 and the piston 25 of syringe 22.

By moving down the syringe 22, said piston 25 will provide for drawing some amount of liquid from the test-tube 47 which, through the probe 46, is supplied to the chamber 28 of cuvette 27 to complete filling up due to the location of the sucking conduit 30 which is at the top of said chamber 28. Of course, the volume of syringe 22 will be adjusted, by adjusting said stops 23 and 23' for sucking a same volume as that of chamber 28 of cuvette 27, probe 46 and its associated conduit 31'.

Thus, the first cycle is completed. By depressing the pushbutton 55 a second time, the motor 1 will be again supplied and its shaft 2 will again rotate by 180°.

In this second cycle, as the cam 12 presents its relieved profile, valve 13 will be opened and because of spring 57 being effective on shaft 37, the probe 46 will have to be raised from the test-tube 47. On opening of valve 13, all of the liquid in the cuvette 27 and conduits 46 and 44 will be exhausted into the flask 48, as drawn by the vacuum provided therein by the vacuum pump 50. Further, due to operation of handle 14 and lever 15, the piston 25 of syringe 22 will be moved back to the starting position and the residual liquid in conduit 30, if any, will be ejected and sucked or drawn by said flask 48.

These first two sucking and exhausting cycles are employed for removing any residual of a previous analyzed liquid which would lead to an uncorrect spectrophotometrical reading. However, the volume being transferred should be the minimum useful for washing and reading operations in order not to waste an undue portion of sample and to this end the sucking mechanism comprises an adjustable syringe.

Now the device will be capable of repeating again the first cycle and thus by depressing again said pushbutton 55 and introducing the probe 46 into the test-tube 47 the liquid will be transferred again to the cuvette 27. At the completion of this cycle, the sector 8, which is driven by a pair of gears 60 and 61 in a ratio of 1:2, will short the wiping contacts 11 and 11' and, since these contacts are electrically connected to the amplifier 35 of the photometrical system, they will enable for measuring being carried out, and this device provides that the photometer can carry out its operations only on a completely stationary liquid.

The invention is particularly designed for use in chemical and biochemical laboratories.

What is claimed is:

1. Method for transferring a predetermined amount of sample liquid to be analyzed form a sample container to a closed cuvette chamber for carrying out spectrophotometrical and colorimetrical tests therein, comprising the steps of placing the interior of the cuvette chamber in communication with a probe and a syringe pump having a pressure stroke and a suction stroke, inserting said probe into said sample liquid in the sample container, withdrawing a predetermined amount of sample from the sample container and transferring said withdrawn sample to the cuvette chamber by actuating a suction stroke of said syringe pump to reduce the pressure in said chamber by a predetermined magnitude, removing the probe from the sample liquid, establishing communication between the bottom of said cuvette chamber and a source of vacuum to withdraw all of the liquid in the cuvette chamber, cutting off said communication between the cuvette chamber and vacuum source, and again withdrawing sample and transferring withdrawn sample to the cuvette chamber by actuating a suction stroke of the syringe pump while the probe is inserted in the sample liquid.

2. Method defined in claim 1, which includes the step of simultaneously actuating a pressure stroke of said syringe pump while said source of vacuum is in communication with the cuvette chamber.

3. Apparatus for carrying out spectrophotometrical and colorimetrical tests on successive samples of liquids, comprising a closed cuvette chamber having portions of opposing walls provided with means to permit transmission of radiant energy through a liquid contained therein, photodetector means including measuring means positioned to be responsive to radiant energy transmitted through said contained liquid, probe means to be inserted into a liquid to be sampled, reversible syringe pump means having a reciprocating piston, conduit means connecting said probe means and said syringe pump means in communication with the interior of said cuvette chamber to transfer liquid from a sample liquid container into said cuvette chamber when the probe means is inserted in said sample liquid and said syringe piston is moved in one direction to create suction in said conduit means and cuvette chamber, vacuum pump means, outlet conduit means including valve means having an open and a closed position and a closed flask connecting said vacuum pump means with the bottom of the interior of said cuvette chamber to withdraw all of the liquid from said cuvette chamber when said valve means is in said open position, electric motor means to reciprocate said syringe means piston, and switching means to connect said motor means with a source of energy, said switching means including means to maintain said valve means closed when said piston is moved by the motor means said suction stroke to maintain said valve means open when said piston is moved in the opposite direction and to energize said measuring means at a predetermined position of said piston.

4. Apparatus as defined in claim 3, wherein said electric motor means includes a rotary driving shaft, a reciprocable slide, crank linkage means connecting said rotary shaft and said slide, the piston of said syringe pump means including an elongated stem, and means connecting said slide with said stem to reciprocate said piston.

5. Apparatus as defined in claim 4, wherein said means connecting said slide with said stem includes adjustment means to vary the stroke of said piston.

6. Apparatus as defined in claim 5, wherein said means connecting said slide with said stem includes a pair of stop blocks positioned on said stem in longitudinally spaced relation, and a fork connected to said slide to engage alternately with a respective one of said pair of stop blocks when the slide is reciprocated.

7. Apparatus as defined in claim 6, wherein each o said stop blocks is longitudinally adjustably positioned on said stem to permit adjustment of the stroke of the piston.

8. Apparatus as defined in claim 2, wherein said valve means included in said outlet conduit means comprises a cylindrical chamber closed at one end by a reciprocable valve piston, said chamber being provided with an inlet opening in communication with the interior of said cuvette chamber and an outlet opening in communication with said vacuum pump means, said valve piston being reciprocable between a first position to block communication between said inlet and outlet openings and a second position to allow communication between the inlet and outlet openings.

9. Apparatus as defined in claim 8, wherein said switching means includes rotary cam-and-follower means, and means connecting said electric motor means to rotate said cam, said follower means being connected with said valve piston to reciprocate said valve piston between said first and second positions.

* * * * *

UNITED STATES PATENT OFFICE
CERTIFICATE OF CORRECTION

Patent No. 3,705,773      Dated December 12, 1972

Inventor(s) Guido Vicario

It is certified that error appears in the above-identified patent and that said Letters Patent are hereby corrected as shown below:

In the heading, after item [21], insert --[30] Foreign Application Priority Data, February 11, 1971, Italy - 20467/70--;

In claim 8, line 1, change "2" to --3--.

Signed and sealed this 27th day of March 1973.

(SEAL)
Attest:

EDWARD M. FLETCHER, JR.
Attesting Officer

ROBERT GOTTSCHALK
Commissioner of Patents